(12) United States Patent
Ausdemore et al.

(10) Patent No.: US 10,358,974 B2
(45) Date of Patent: Jul. 23, 2019

(54) CLOSED-LOOP THERMAL CYCLE EXPANDER BYPASS FLOW CONTROL

(71) Applicant: Calnetix Technologies, LLC, Cerritos, CA (US)

(72) Inventors: Doug Ausdemore, Cerritos, CA (US); Shamim Imani, Fullerton, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 16 days.

(21) Appl. No.: 15/792,990

(22) Filed: Oct. 25, 2017

(65) Prior Publication Data
US 2019/0120137 A1    Apr. 25, 2019

(51) Int. Cl.

| | |
|---|---|
| *F02C 1/10* | (2006.01) |
| *F01D 21/12* | (2006.01) |
| *F01K 25/00* | (2006.01) |
| *F01D 19/00* | (2006.01) |
| *F01K 23/04* | (2006.01) |
| *F02C 7/20* | (2006.01) |
| *F01D 17/02* | (2006.01) |
| *F02C 1/00* | (2006.01) |
| *F01D 21/14* | (2006.01) |
| *F01D 19/02* | (2006.01) |

(52) U.S. Cl.
CPC ............ *F02C 1/105* (2013.01); *F01D 17/02* (2013.01); *F01D 19/00* (2013.01); *F01D 19/02* (2013.01); *F01D 21/12* (2013.01); *F01D 21/14* (2013.01); *F01K 23/04* (2013.01); *F01K 25/00* (2013.01); *F02C 1/005* (2013.01); *F02C 7/20* (2013.01)

(58) Field of Classification Search
CPC .. F02C 1/105; F02C 1/005; F02C 7/20; F01D 21/12; F01D 19/02; F01D 19/00; F01D 21/14; F01D 17/02; F01K 25/00; F01K 23/04
USPC ................. 60/646, 651, 656, 657, 670–681; 415/203–205
See application file for complete search history.

(56) References Cited

U.S. PATENT DOCUMENTS 2,235,547 A * 3/1941 Blowney ............... F01D 17/145
                                                                                                                        415/145
2,747,373 A * 5/1956 Eggenberger ........... F01D 19/00
                                                                                                                          60/656

(Continued)

FOREIGN PATENT DOCUMENTS

JP                5411087 B2 * 2/2014

*Primary Examiner* — Hoang M Nguyen
(74) *Attorney, Agent, or Firm* — Fish & Richardson P.C.

(57) ABSTRACT

A closed loop thermal cycle expander bypass flow control is described. An expander is positioned within and surrounded by a housing to receive a working fluid and rotate in response to expansion of the working fluid flowing through the expander. A bypass channel is positioned within and surrounded by the housing to define a fluid flow path that bypasses the expander. A fluid flow control sub-assembly is fluidically coupled to the expander and the bypass channel, and attached to the housing. The fluid flow control sub-assembly can receive the working fluid at a housing inlet and either flow the working fluid through the expander and block the working fluid from flowing through the bypass channel, or flow the working fluid through the housing bypassing the expander, flow the working fluid out via a housing outlet, and block the working fluid from flowing through the expander.

20 Claims, 4 Drawing Sheets

(56) References Cited

U.S. PATENT DOCUMENTS

| | | | | |
|---|---|---|---|---|
| 3,277,652 A | * | 10/1966 | Brown | F01D 21/02 |
| | | | | 415/101 |
| 3,813,884 A | * | 6/1974 | Ishikawa | F01K 7/24 |
| | | | | 60/646 |
| 3,978,885 A | * | 9/1976 | Lu | F01D 17/145 |
| | | | | 137/560 |
| 2016/0214462 A1 | * | 7/2016 | Zhou | F01K 15/02 |

* cited by examiner

CLOSED-LOOP THERMAL CYCLE EXPANDER BYPASS FLOW CONTROL

TECHNICAL FIELD

This disclosure relates to controlling working fluid flow in a thermal cycle, for example, a closed-loop thermal cycle, based on a state of an expander of the thermal cycle.

BACKGROUND

In a thermal cycle, for example, a closed-loop thermal cycle such as Organic Rankine Cycle (ORC) or other cycle, a working fluid is flowed through an integrated power module (IPM) that includes an expander or a turbine. An efficiency of the thermal cycle depends, in part, on a quality of the working fluid. The bypass loop is activated when the quality is below the required state, such as in the startup cycle, and circulates the fluid until quality is within limits. In some instances, the thermal cycle efficiency can be optimized by flowing the working fluid through the expander while, in other instances, the efficiency can be optimized by bypassing the expander. Examples of systems that control flow of the working fluid through the expander include valves (for example, slam valves or other valves) and associated piping that are external to the expander itself.

SUMMARY

This disclosure describes technologies relating to closed-loop thermal cycle expander bypass flow control.

Certain aspects of the subject matter described here can be implemented as a closed-loop thermal cycle. The thermal cycle includes a housing. An expander is positioned within and surrounded by the housing. The expander can receive a working fluid and rotate in response to expansion of the working fluid flowing into an expander inlet and out of an expander outlet. The expander inlet and the expander outlet are positioned in the housing. A bypass channel is positioned within and surrounded by the housing. The bypass channel defines a fluid flow path that bypasses the expander. A fluid flow control sub-assembly is fluidically coupled to the expander and the bypass channel, and attached to the housing. The fluid flow control sub-assembly is operable in a first state and in a second state. When operated in the first state, the fluid flow control sub-assembly can receive the working fluid at a housing inlet, flow the working fluid through the expander, and block the working fluid from flowing through the bypass channel. When operated in the second state, the fluid flow control sub-assembly can receive the working fluid at the housing inlet, flow the working fluid through the housing bypassing the expander, flow the working fluid out via a housing outlet, and block the working fluid from flowing through the expander.

This, and other aspects, can include one or more of the following features. The bypass channel can include a flow control inlet and a flow control outlet. The fluid flow control sub-assembly can include a bypass component positioned at least partially in the bypass channel between and fluidically coupling the flow control inlet and the flow control outlet. The bypass component can close the flow control inlet to flow the working fluid through the expander in response to the fluid flow control sub-assembly being in the first state, and open the flow control inlet to receive the working fluid and bypass the expander in response to the fluid flow control sub-assembly being in the second state. The fluid flow control sub-assembly can include an actuator unit that can move the bypass component to close the flow control inlet and to open the flow control inlet. The actuator unit can include a spring coupled to the bypass component and a solenoid coupled to the spring. The solenoid can retract the spring and move the bypass component to open the flow control inlet, and expand the spring and move the bypass component to close the flow control inlet. The actuator unit can include at least one guide pin coupled to the spring and the bypass component. The bypass component can include a first inclined surface positioned nearer to the flow control inlet than to the flow control outlet. The first inclined surface can be inclined to flow the working fluid into the flow control sub-assembly in response to the fluid flow control sub-assembly being in the second state. The bypass component can include a substantially horizontal surface directly connected to the first inclined surface, and a second inclined surface positioned nearer to the flow control outlet than to the flow control inlet. The second inclined surface can be directly connected to the substantially horizontal surface, and can be inclined to flow the working fluid into the flow control outlet. A conduit having a first end connected to the flow control outlet and a second end connected to the housing outlet can flow the working fluid from the flow control outlet to the housing outlet and to atmosphere. The fluid flow control sub-assembly can be in the second state in response to the expander being in a start-up state, a shutdown state or an emergency state. The fluid flow control sub-assembly is in the first state in response to the expander being in an operational state. The fluid flow control sub-assembly is directly attached to the housing. When operated in the second state, the fluid flow control sub-assembly can flow an entirety of the working fluid through the housing without any portion of the working fluid flowing outside the housing.

Certain aspects of the subject matter described here can be implemented as a method. The method is implemented in a closed-loop thermal cycle described above. An input to place the fluid flow control sub-assembly in the second state is detected. In response, the working fluid is received at a housing inlet and flowed through the bypass channel bypassing the expander. The working fluid is blocked from flowing through the expander and is flowed out via a housing outlet.

This, and other aspects, can include one or more of the following features. The input can be a first input. A second input to place the fluid flow control sub-assembly in the second state can be detected. In response to the second input, the working fluid received at the housing inlet can be flowed through the expander. Flow of the working fluid through the bypass channel can be blocked. The expander can be in at least one of a start-up state, a shutdown state or an emergency state. In response to detecting the first input, the fluid flow control sub-assembly can be placed in the second state by positioning the bypass component to open the flow control inlet to receive the working fluid and bypass the expander. In response to detecting the second input, the fluid flow control sub-assembly can be placed in the first state by positioning the bypass component to close the flow control inlet to flow the working fluid through the expander. To move the bypass component from the first state to the second state, the spring is retracted by the solenoid to open the flow control inlet. To move the bypass component from the second state to the first state, the spring is expanded by the solenoid to move the bypass component to close the inlet. In response to detecting the input, an entirety of the working fluid is flowed through the housing without any portion of the working fluid flowing outside the housing.

Certain aspects of the subject matter described here can be implemented as a system. The system includes a housing. A centrifugal expander is positioned within and surrounded by the housing. The centrifugal expander is configured to receive a working fluid and rotate in response to expansion of the working fluid flowing into an expander inlet and out of an expander outlet. A bypass channel is positioned within and surrounded by the housing. The bypass channel defines a fluid flow path that bypasses the centrifugal expander. A fluid flow control sub-assembly is fluidically coupled to the bypass channel and the centrifugal expander, and directly attached to the housing. The fluid flow control sub-assembly is operable in a first position and in a second position. The fluid flow control sub-assembly, when operated in the first position, is configured to flow the working fluid through the centrifugal expander while blocking the working fluid from flowing through the bypass channel, and when operated in the second position, is configured to flow an entirety of the working fluid through the housing bypassing the centrifugal expander while blocking the working fluid from flowing through the centrifugal expander.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes controlling flow of working fluids for thermal cycles, for example, closed-loop thermal cycles such as ORCs or other closed-loop thermal cycles. In some implementations, depending upon an operational state of an expander of the thermal cycle (for example, a start-up state, an operational state, a shutdown state, an emergency state, or other state), flow of the working fluid can be either directed through the expander or bypassed around the expander. To do so, in some implementations, a flow control sub-assembly is attached, for example, directly attached, to a housing in which the expander is positioned. The sub-assembly flows substantially an entirety of the working fluid within the housing whether the working fluid flows through the expander or bypasses the expander. In other words, the flow control sub-assembly can be integrated into the housing that houses the expander. In some implementations, the expander can be a centrifugal expander or a turbo-expander through which the working fluid flows, and the system can be any system, that is, different from an ORC or other closed-loop thermal cycle. The techniques and systems described here can be implemented to control the flow of fluids through such a system with the centrifugal expander or the turbo-expander.

In this manner, the flow control sub-assembly can replace components external to the housing, for example, the slam valves and associated piping. Consequently, a cost of manufacturing the thermal cycle and a time to do so can be decreased. Also, performance of the overspeed can be improved by decreasing the reaction time of the bypass and reducing the volume at an inlet of the expander when switching working fluid flow. By reducing the overspeed, less energy is created. The need for external devices to handle this energy can be reduced. Reliability can be improved by eliminating failure points such as piping welds and valve components. Pneumatic controls for the slam valves can also be eliminated.

Figure 1A:
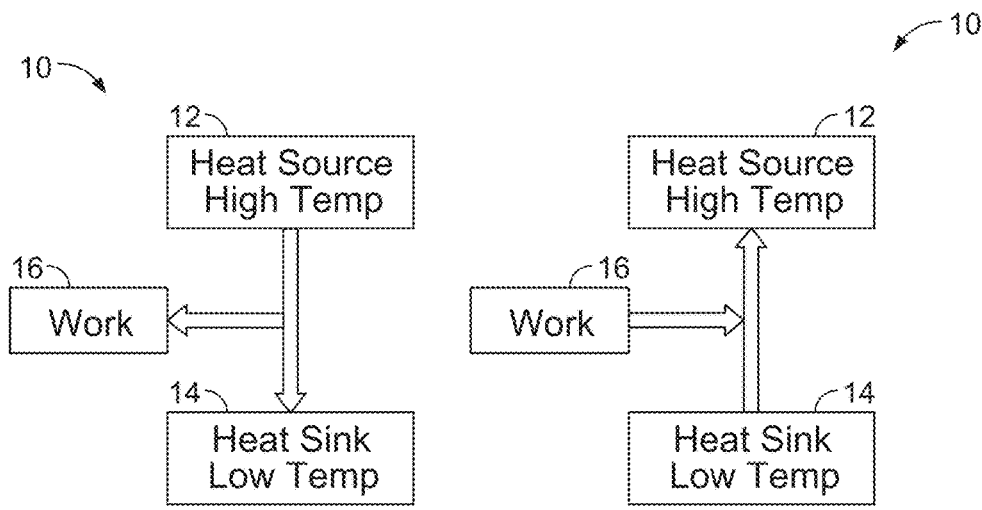
FIG. 1A is a schematic diagram of an example thermal cycle.

FIG. 1A is a schematic diagram of an example thermal cycle 10. The cycle includes a heat source 12 and a heat sink 14. The heat source temperature is greater than heat sink temperature. Flow of heat from the heat source 12 to heat sink 14 is accompanied by extraction of heat and/or work 16 from the system. Conversely, flow of heat from heat sink 14 to heat source 12 is achieved by application of heat and/or work 16 to the system. Extraction of heat from the heat source 12 or application of heat to heat sink 14 is achieved through a heat exchanging mechanism. Systems and apparatus described in this disclosure are applicable to any heat sink 14 or heat source 12 irrespective of the thermal cycle. For descriptive purposes, a Rankine Cycle (or Organic Rankine Cycle) is described by way of illustration, though it is understood that the Rankine Cycle is an example thermal cycle, and this disclosure contemplates other thermal cycles. Other thermal cycles within the scope of this disclosure include, but are not limited to, Sterling cycles, Brayton cycles, Kalina cycles, etc.

Figure 1B:
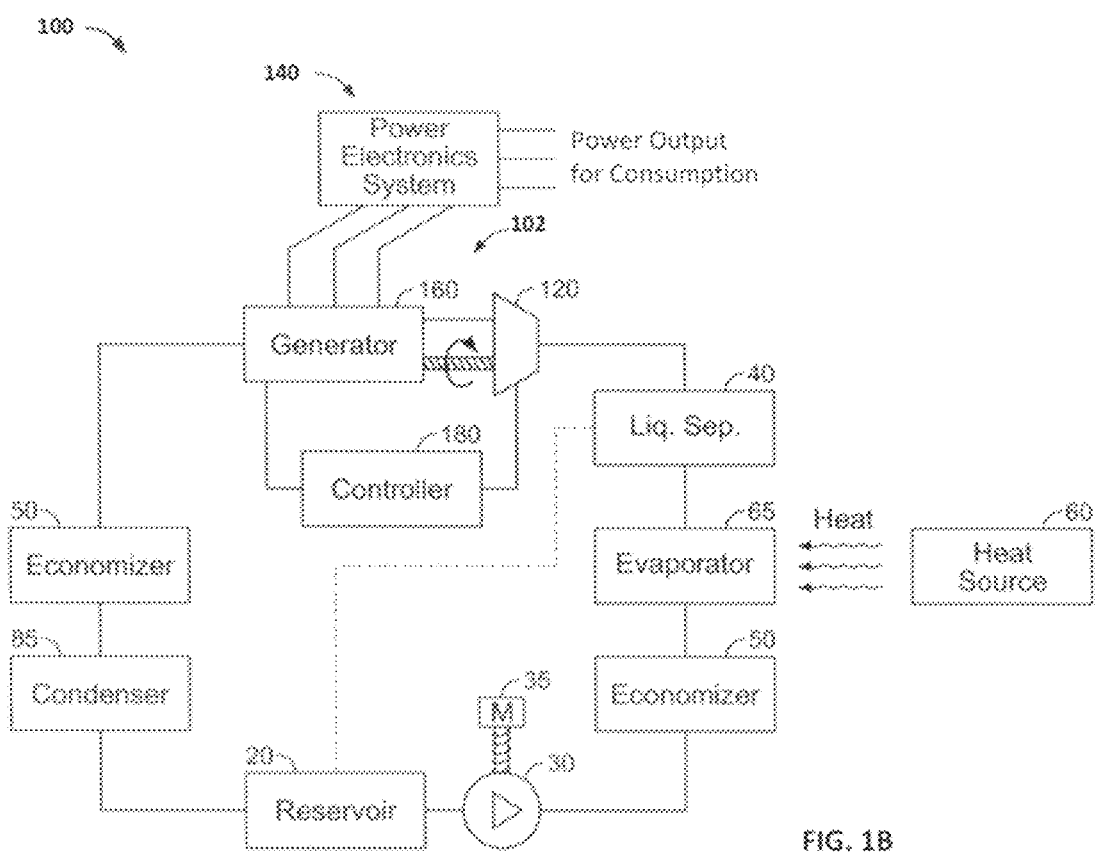
FIG. 1B is a schematic diagram of an example Rankine Cycle system illustrating example Rankine Cycle system components.

FIG. 1B is a schematic diagram of an example Rankine Cycle system illustrating example Rankine Cycle system components. The fluid flow control sub-assembly described later can be integrated with one or more elements of the Rankine Cycle 100 to control flow of working fluid through the Ranking Cycle 100. The Rankine Cycle 100 may be an Organic Rankine Cycle ("Rankine Cycle"), which uses an engineered working fluid to receive waste heat from another process, such as, for example, from the compressor+engine that the Rankine Cycle system components are integrated into. In certain instances, the working fluid may be a refrigerant (e.g., an HFC, CFC, HCFC, ammonia, water, R245fa, or other refrigerant). In some circumstances, the working fluid in the Rankine Cycle 100 may include a high molecular mass organic fluid that is selected to efficiently receive heat from relatively low temperature heat sources. As such, the turbine generator apparatus 102 can be used to recover waste heat and to convert the recovered waste heat into electrical energy.

In certain instances, the turbine generator apparatus 102 includes a turbine 120 (also known as an expander) and a generator 160. The turbine generator apparatus 102 can be used to convert heat energy from a heat source into kinetic energy (e.g., rotation of the rotor), which is then converted into electrical energy. The turbine 120 is configured to receive heated and pressurized gas, which causes the turbine 120 to rotate (and expand/cool the gas passing through the turbine 120). Turbine 120 is coupled to a rotor of generator 160 using, for example, a common shaft or a shaft connected by a gear box. The rotation of the turbine 120 causes the shaft to rotate, which in-turn, causes the rotor of generator 160 to rotate. The rotor rotates within a stator to generate electrical power. For example, the turbine generator apparatus 102 may output electrical power that is configured by a power electronics package to be in form of 3-phase 60 Hz power at a voltage of about 400 VAC to about 480 VAC. Alternative embodiments may output electrical power at different power and/or voltages. Such electrical power can be transferred to a power electronics system 140, other electrical driven components within or outside the engine compressor system and, in certain instances, to an electrical power grid system. Turbine 120 may be an axial, radial, screw or other type turbine. The gas outlet from the turbine 120 may be coupled to the generator 160, which may receive the gas from the turbine 120 to cool the generator components.

Rankine Cycle 100 may include a pump device 30 that pumps the working fluid. The pump device 30 may be coupled to a liquid reservoir 20 that contains the working fluid, and a pump motor 35 can be used to operate the pump. The pump device 30 may be used to convey the working fluid to an evaporator/preheater heat exchanger 65. Evaporator/preheater heat exchanger 65 may receive heat from a heat source 60, such as a waste heat source from one or more heat sources associated with a compressor+engine. Example sources of heat include heat from compression, engine exhaust, engine jacket water, system air coolers, a combination of the foregoing, etc. In such circumstances, the working fluid may be directly heated or may be heated in a heat exchanger in which the working fluid receives heat from a byproduct fluid of the process. In certain instances, the working fluid can cycle through the heat source 60 so that at least a substantial portion of the fluid is converted into gaseous state.

Typically, working fluid at a low temperature and high pressure liquid phase from the pump device 30 is circulated into one side of the economizer 50, while working fluid that has been expanded by a turbine upstream of a condenser is at a high temperature and low pressure vapor phase and is circulated into another side of the economizer 50 with the two sides being thermally coupled to facilitate heat transfer there between. Although illustrated as separate components, the economizer 50 (if used) may be any type of heat exchange device, such as, for example, a plate and frame heat exchanger, a shell and tube heat exchanger or other device.

The evaporator/preheater heat exchanger 65 may receive the working fluid from the economizer 50 at one side and receive a supply of thermal fluid (that is (or is from) the heat source 60) at another side, with the two sides of the evaporator/preheater heat exchanger 65 being thermally coupled to facilitate heat exchange between the thermal fluid and working fluid. For instance, the working fluid enters the evaporator/preheater heat exchanger 65 from the economizer 50 in liquid phase and is changed to a vapor phase by heat exchange with the thermal fluid supply. The evaporator/preheater heat exchanger 65 may be any type of heat exchange device, such as, for example, a plate and frame heat exchanger, a shell and tube heat exchanger or other device.

In certain instances of the Rankine Cycle 100, the working fluid may flow from the outlet conduit of the turbine generator apparatus 102 to a condenser heat exchanger 85. The condenser heat exchanger 85 is used to remove heat from the working fluid so that all or a substantial portion of the working fluid is converted to a liquid state. In certain instances, a forced cooling airflow or water flow is provided over the working fluid conduit or the condenser heat exchanger 85 to facilitate heat removal. After the working fluid exits the condenser heat exchanger 85, the fluid may return to the liquid reservoir 20 where it is prepared to flow again though the Rankine Cycle 100. In certain instances, the working fluid exits the generator 160 (or in some instances, exits a turbine 120) and enters the economizer 50 before entering the condenser heat exchanger 85.

Liquid separator 40 (if used) may be arranged upstream of the turbine generator apparatus 102 so as to separate and remove a substantial portion of any liquid state droplets or slugs of working fluid that might otherwise pass into the turbine generator apparatus 102. Accordingly, in certain instances of the embodiments, the gaseous state working fluid can be passed to the turbine generator apparatus 102, while a substantial portion of any liquid-state droplets or slugs are removed and returned to the liquid reservoir 20. In certain instances of the embodiments, a liquid separator may be located between turbine stages (e.g., between the first turbine wheel and the second turbine wheel, for multi-stage expanders) to remove liquid state droplets or slugs that may form from the expansion of the working fluid from the first turbine stage. This liquid separator may be in addition to the liquid separator located upstream of the turbine apparatus.

Controller 180 may provide operational controls for the various cycle components, including the heat exchangers and the turbine generator. Controller 180 is similar to the programmable logic controller described in more detail below.

Figure 2A:
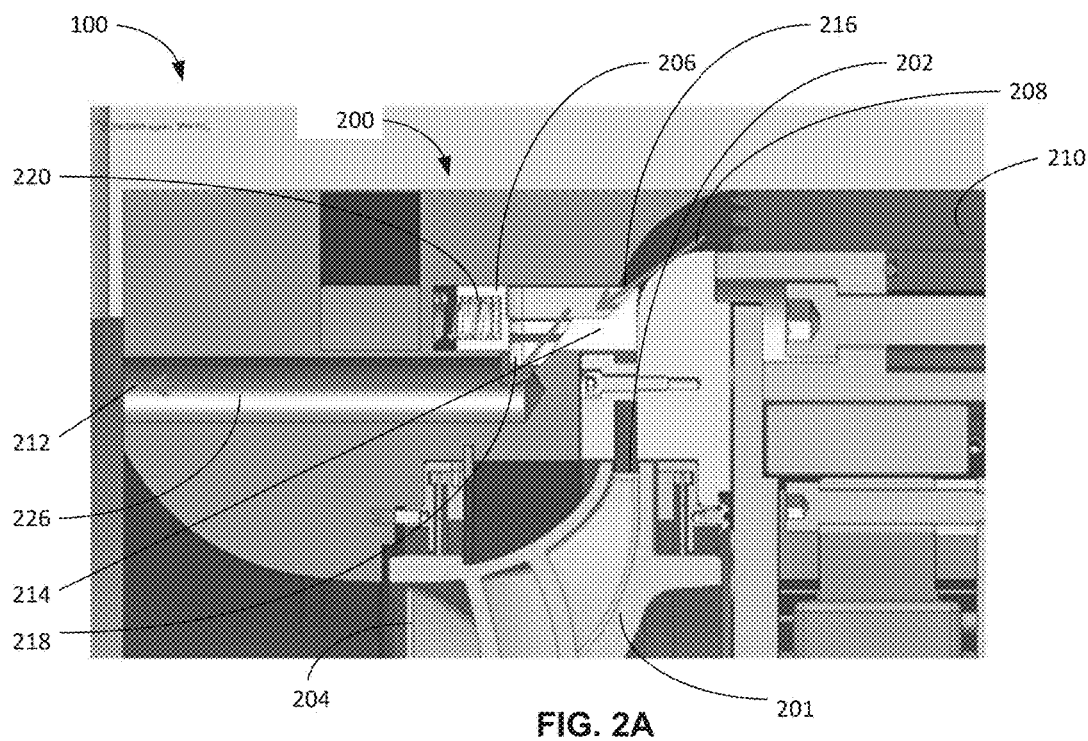
FIG. 2A is a schematic diagram of an example expander in a bypass state.

FIG. 2A is a schematic diagram of an example expander in a bypass state. The expander 201 can be the turbine 120 included in the thermal cycle 100. Alternatively, in some implementations, the expander can be a centrifugal expander implemented in a system other than the thermal cycle 100. Such a system can include features similar to the thermal cycle 100, which, taken together, are configured to implement the techniques that are described with reference to the thermal cycle 100. The thermal cycle 100 can include a housing 200. The expander 201 can be positioned within and surrounded by the housing 200. Like the turbine 120, the expander 201 can receive a working fluid 208 and rotate in response to expansion of the working fluid 208 flowing into an expander inlet 202 and out of an expander outlet 204. The expander 201 is coupled to a rotor of a generator (not shown in FIG. 2A) using, for example, a common shaft or a shaft connected by a gear box. The rotation of the expander 201 causes the shaft to rotate, which in-turn, causes the rotor of the generator to rotate. The rotor rotates within a stator to generate electrical power.

The thermal cycle 100 includes a fluid flow control sub-assembly 206 that is coupled to the expander 201 and directly attached to the housing 200. In some implementations, the sub-assembly 206 is positioned within a portion of the housing 200 or in a separate sub-housing that is directly attached to the housing 200. The portion of the housing 200 or the sub-housing can be formed (for example, die cast or forged) to have features that can receive the sub-assembly 206. For example, the portion of the housing 200 or the sub-housing can include cavities, channels, or other openings in which components of the sub-assembly 206 (described below) can be positioned. The portion of the housing 200 or the sub-housing can also include an inlet that interfaces with fluidic flow pathway of the working fluid 208 through the housing 200, and an outlet. The outlet, for example, can lead directly to the atmosphere or can interface with the housing outlet 212 through one or more components of the sub-assembly 206, both of which can bypass the expander 201.

The expander 201 and the sub-assembly 206 are fluidically coupled to one another such that the sub-assembly 206 selectively permits the working fluid 208 to either flow into and through the expander 201 or to bypass and avoid the expander 201. The expander 201 and the sub-assembly 206 are positioned within and surrounded by the housing 200 such that a bypass flowpath for the working fluid 208 lies entirely within the housing 200. In other words, the sub-assembly 206 is directly attached to the housing 200 and lies within the housing 200 to flow an entirety of the working fluid 208 through the housing 200 without any portion of the working fluid 208 flowing outside the housing 200.

The sub-assembly 206 is operable in a first state, for example, an operational state, and in a second state or bypass state, for example, a start-up state, a shutdown state or an emergency state. In the operational state, parameters of the thermal cycle 100 (for example, quality, such as, temperature, pressure, or other qualities, of the working fluid 208, or other parameters of the thermal cycle 100) fall within a range at which expansion of the working fluid 208 within the expander 201 allowable limits of the thermal cycle 100. In the bypass state, such expansion of the working fluid 208 within the expander 201 does not result in required saturation limits of the fluid quality. For example, in the start-up state the steam quality needs to be improved before it is allowed to pass through the expander (201). The working fluid 208, will pass through the sub-assembly 206 until the fluid reaches the desired state. During shutdown state, the quality of the working fluid 208 can be outside an operating range. Alternatively, or in addition, in the emergency state, the parameters of the thermal cycle 100 may necessitate quick (i.e., nearly instantaneous) shut down. At this time, fluid is immediately removed from the expander, stopping the transfer of energy.

In the operational state, the sub-assembly 206 is removed from the flow path and directs the flow of the working fluid 208 at a housing inlet 210 and flow the working fluid 208 through the expander 201. That is, the sub-assembly 206 forms a first fluidic pathway between the housing inlet 210 and the expander inlet 201 in the operational state. In the bypass state, the sub-assembly 206 receives the working fluid 208 at the housing inlet 210, flows the working fluid 206 through the housing 200 bypassing the expander 201, and flows the working fluid 208 out via a housing outlet 212. That is, the sub-assembly 206 closes the first fluidic pathway and forms a second fluidic pathway between the housing inlet 210 and the housing outlet 212, the second fluidic pathway bypassing the expander 201. The second fluidic pathway is entirely contained within the housing 200 such that no portion of the working fluid 208 flows outside the housing 200 when the sub-assembly 206 is in the bypass state.

The sub-assembly 206 includes a bypass channel 217 having a flow control inlet 216, a flow control outlet 218 and a bypass component 214 positioned between and fluidically coupling the flow control inlet 216 and the flow control outlet 218. The bypass component 214 can close the flow control inlet 216 to flow the working fluid 208 through the expander 201 in response to the sub-assembly 206 being in the operational state. In this position, the bypass component 214 permits working fluid flow through the first fluidic pathway described above and blocks working fluid flow through the bypass channel 217. The bypass component 214 can open the flow control inlet 216 to receive the working fluid 208 and bypass the expander 201 in response to the sub-assembly 206 being in the bypass state. In this position, the bypass component 214 closes the first fluidic pathway, i.e., blocks working fluid flow through the expander 201, and permits working fluid flow through the second fluidic pathway.

The sub-assembly 206 includes an actuator unit 220 that can move the bypass component 214 to close and open the flow control inlet 216. The actuator unit 220 includes a spring 222 coupled to the bypass component 214, and a solenoid 224 coupled to the spring 222. In the operational state, the solenoid 224 can be activated (for example, by a controller (not shown)) to retract the spring 222 and move the bypass component 214 to open the first fluidic pathway that couples the housing inlet 210 to the expander 201. In the bypass state, the solenoid 224 can be de-activated to expand the spring 222 and move the bypass component 214 to close the first fluidic pathway. In this position, the construction of the bypass component 214 (described below with reference to FIG. 3) closes the flow control inlet 216, and, consequently, the first fluidic pathway, and opens the second fluidic pathway that couples the housing inlet 210 to the housing outlet 212. In some implementations, the actuator unit 220 includes at least one guide pin (not shown) coupled to the spring 222 and the bypass component 214. The one or more guide pins transfer a retraction or an expansion of the spring 222 to the bypass component 214, thereby moving the bypass component 214 when the solenoid 224 retracts or expands the spring 222.

Figure 2B:
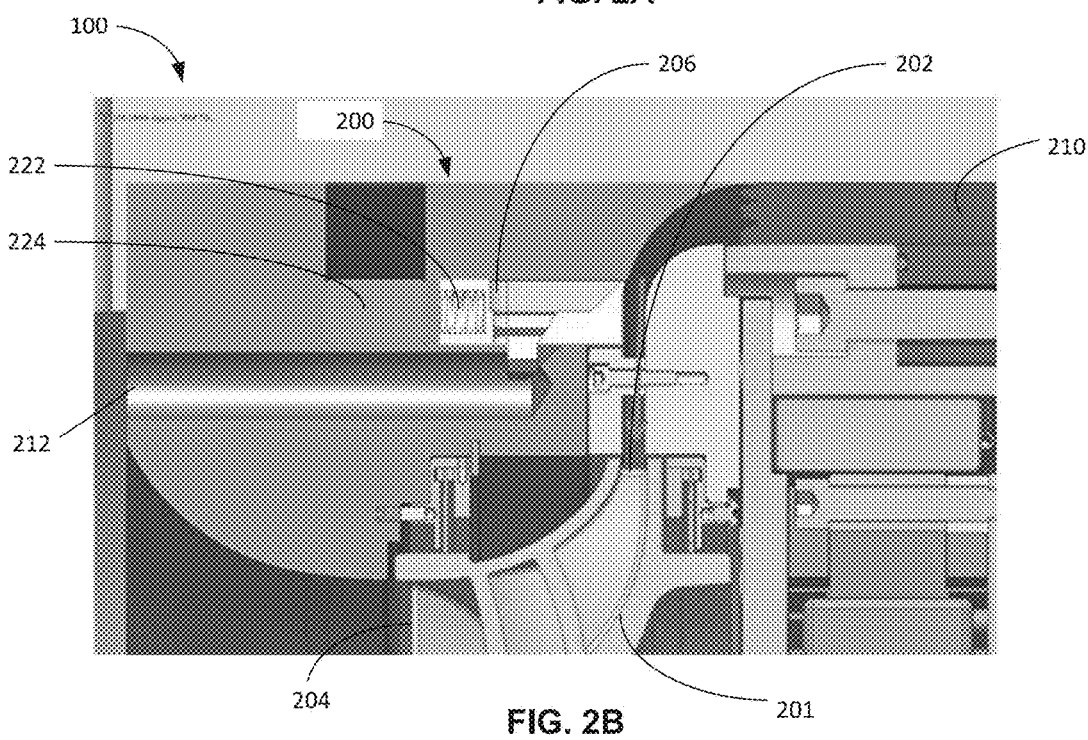
FIG. 2B is a schematic diagram of the example expander in an operational state.

FIG. 2A shows the thermal cycle 100 in a bypass state. In this state, the solenoid 224 expands the spring 222, which pushes the bypass component 214 to close the flow control inlet 216. The working fluid 210 from the housing inlet 210 is diverted through a conduit 226 that has a first end connected to the flow control outlet 218 and a second end connected to the housing outlet 212. The conduit 226 flows the working fluid from the flow control outlet 218 to the housing outlet 212 and to atmosphere. The conduit 226 is a portion of the second fluidic pathway that bypasses the expander 201. FIG. 2B is a schematic diagram of the example expander in the operational state. In this state, the solenoid 224 retracts the spring 222, which pulls the bypass component 214 to open the flow control inlet 216. The working fluid 210 from the housing inlet 210 is directed toward the expander inlet 202, through the expander 201 and out the expander outlet 204, i.e., through the first fluidic pathway.

Figure 3:
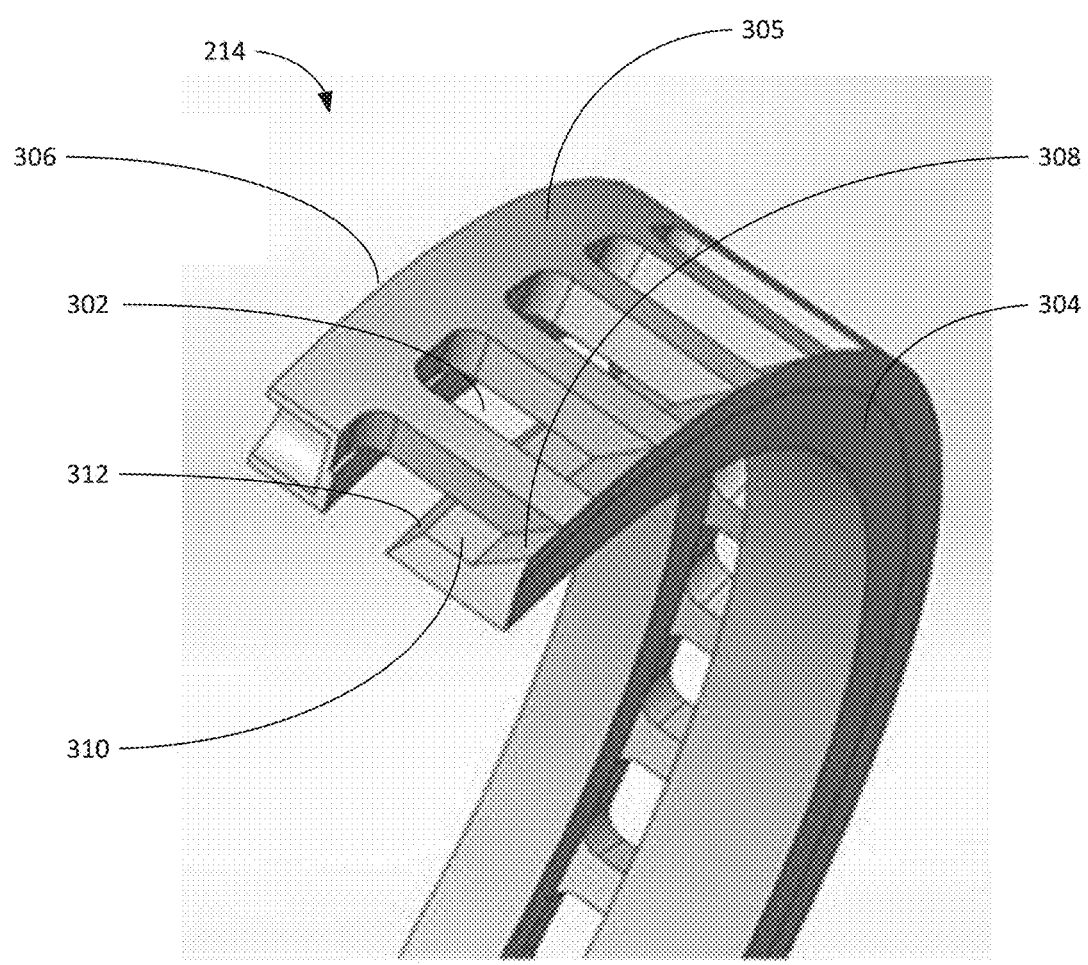
FIG. 3 is a schematic diagram of a bypass component of a flow control sub-assembly of a closed-loop thermal cycle.

FIG. 3 is a schematic diagram of a bypass component, for example, the bypass component 214, of a flow control sub-assembly, for example, the sub-assembly 206, of a closed-loop thermal cycle, for example, the thermal cycle 100. As described above, the bypass component is moved between a first position, when the sub-assembly 206 is in an operational state, and a second position, when the sub-assembly 206 is in a bypass state, by the actuator unit. As described above, the portion of the housing 200 or the sub-housing in which the sub-assembly 206 is positioned includes cavities, channels or other openings in which components of the sub-assembly 206 are positioned. For example, the portion or the sub-housing can include an opening for the actuator unit (i.e., the spring 220 and the solenoid 222) and an opening for the bypass component 214 having a cross-section that matches that of the bypass component 214.

In some implementations, the bypass component 214 can have a substantially circular cross-section. The bypass component 214 can be a hollow, ring-shaped member having a first end surface 304 and a second end surface 306, each of which can be perpendicular to a longitudinal axis (not shown) passing through a geometric center of the bypass component 214. The two end surfaces can be connected by an axial surface 305. One or more openings (for example, an opening 302) can be formed in the axial surface 305.

A conduit or channel can fluidically connect the housing inlet 210 to the expander inlet 202. An opening can be formed in the channel, and the bypass component 214 can be positioned in the opening. The second end surface 306 can be contoured and dimensioned to match that of the opening such that, when the bypass component 214 is positioned at the opening, the working fluid 208 flows from the housing inlet 210 to the expander inlet 202 with no or minimal working fluid leaking through the openings in the axial surface 305. In this position, the sub-assembly 206 is in the operational state, the flow control inlet 216 is closed, and the working fluid 208 is flowed to the expander 201. The actuator unit can push the bypass component 214 to the second position, as described above. The distance between the first position and the second position can be substantially equal to a width of the conduit or channel that fluidically connects the housing inlet 210 to the expander inlet 202.

The bypass component 214 can include a first inclined surface 308 that is directly attached to the second end surface 304. The surface 308 is inclined by extending radially towards the geometric center of the bypass component 214 and axially away from the second end surface 304. The bypass component 214 includes a substantially horizontal surface 310 directly attached to the first inclined surface 308. The surface 310 can originate at an edge of the surface 308 that is away from and extend horizontally (i.e., parallel to the longitunal axis) away from the second end surface 304. The bypass component 214 includes a second inclined surface 312 that is directly attached to the horizontal surface 310. The surface 312 is inclined by extending radially toward the geometric center of the bypass component 214 and axially away from the horizontal surface 310. The arrangement of the surfaces 308, 310 and 312 and the openings on the axial surface 305 form a fluidic channel that receives the working fluid 208 when the bypass component 214 is pushed to the second position. Because the bypass component 214 is pushed by a distance that is substantially equal to a width of the conduit or channel that fluidically connects the housing inlet 210 to the expander inlet 202, the second end surface 304 is positioned to close the conduit or channel when the bypass component is in the second position. The working fluid 208 is then forced to flow in the fluidic channel defined by the openings on the axial surface 305 and the surfaces 308, 310 and 312, thereby bypassing the expander 201.

When the state of the sub-assembly 206 is changed from bypass state to the operational state, the actuator unit move the bypass component 214 from the second position to the first position. In the first position, the openings in the axial surface 305 are closed and the conduit or channel connecting the housing inlet to the expander inlet 202 is opened. The working fluid 208 flows to the expander 201.

Figure 4:
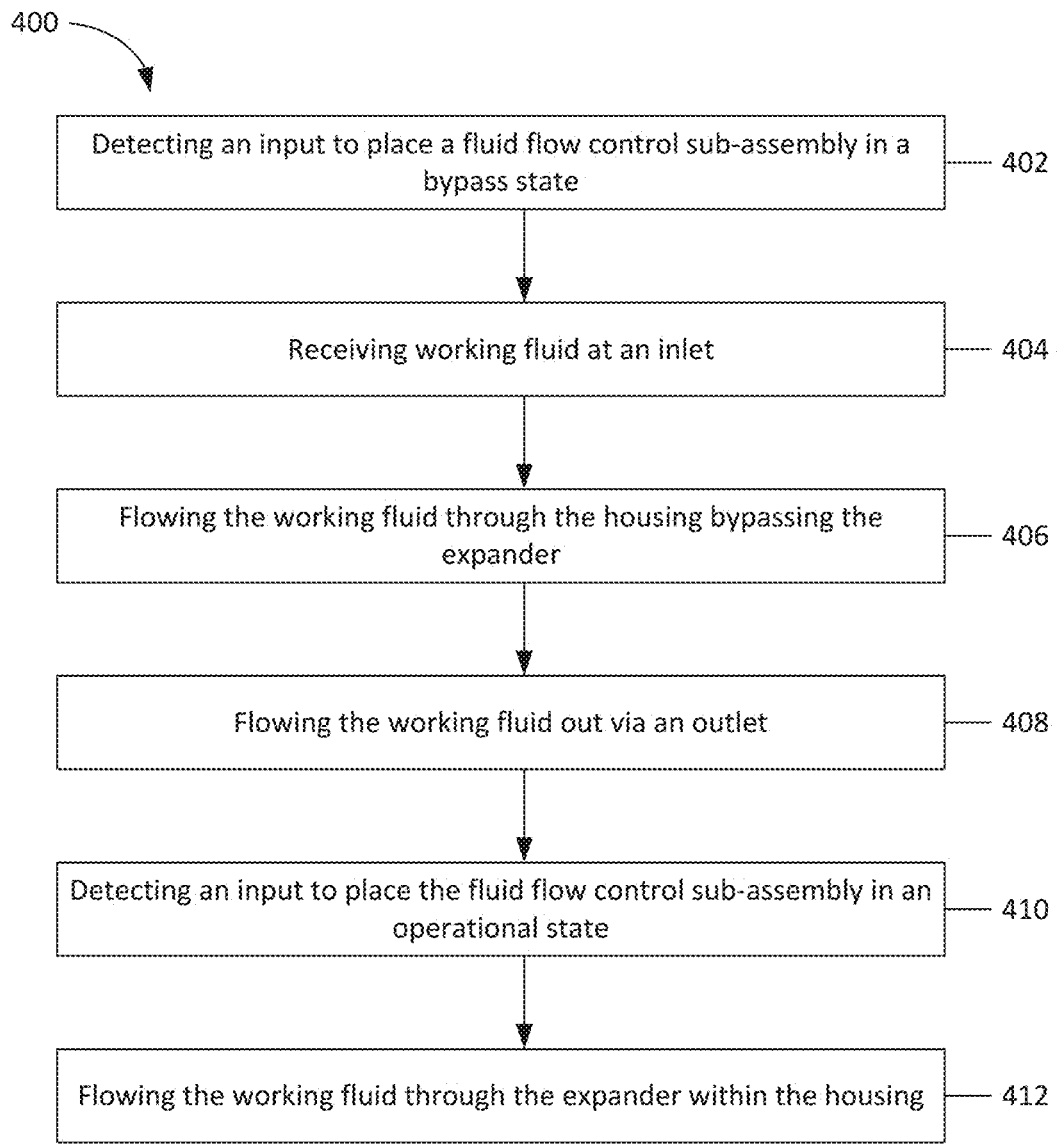
FIG. 4 is a flowchart of an example of a process for controlling working fluid flow through an expander of a closed-loop thermal cycle.

FIG. 4 is a flowchart of an example of a process 400 for controlling working fluid flow through an expander of a closed-loop thermal cycle. The process 400 can be implemented, for example, by a controller connected to the actuator unit of the sub-assembly 206. At 402, an input to place the control sub-assembly 206 in a bypass state is detected. At 404 and in response to the input, working fluid is received at an inlet, for example, the flow control inlet 216. At 406, the working fluid is flowed through the housing 200 bypassing the expander 201. For example, the working fluid is flowed through the bypass channel 217 and flow of the working fluid through the expander 201 is blocked or sealed. At 408, the working fluid is flowed out via an outlet, for example, the flow control outlet 218 and further the housing outlet 212. At 410, an input to place the sub-assembly 206 in an operational state is detected. At 412 and in response to the input, the working fluid is flowed through the expander 201 within the housing 200. For example, the working fluid is flowed through the expander 201 and flow of the working fluid through the bypass channel 217 is blocked or sealed.

Thus, particular implementations of the subject matter have been described. Other implementations are within the scope of the following claims.

The invention claimed is:

1. A system comprising:
   a housing;
   a centrifugal expander positioned within and surrounded by the housing, the expander configured to receive a working fluid and rotate in response to expansion of the working fluid flowing into an expander inlet and out of an expander outlet, the expander inlet and the expander outlet positioned in the housing;
   a bypass channel positioned within and surrounded by the housing, the bypass channel defining a fluid flow path that bypasses the centrifugal expander; and
   a fluid flow control sub-assembly fluidically coupled to the expander and the bypass channel, and directly attached to the housing, the fluid flow control sub-assembly operable in a first position and in a second position, the fluid flow control sub-assembly, when operated in the first position, configured to: flow the working fluid through the centrifugal expander while blocking the working fluid from flowing through the bypass channel, and when operated in the second position, configured to flow an entirety of the working fluid through the housing bypassing the centrifugal expander while blocking the working fluid from flowing through the centrifugal expander.

2. The system of claim 1, wherein the bypass channel comprises:
   a flow control inlet;
   a flow control outlet; and
   wherein the fluid flow control sub-assembly comprises:
   a bypass component positioned at least partially in the bypass channel between and fluidically coupling the flow control inlet and the flow control outlet, the bypass component configured to:
      close the flow control inlet to flow the working fluid through the expander in response to the fluid flow control sub-assembly being in the first position; and
      open the flow control inlet to receive the working fluid and bypass the expander in response to the fluid flow control sub-assembly being in the second position.

3. The system of claim 2, wherein the fluid flow control sub-assembly comprises an actuator unit configured to move the bypass component to close the flow control inlet and to open the flow control inlet.

4. The system of claim 3, wherein the actuator unit comprises:
   a spring coupled to the bypass component; and
   a solenoid coupled to the spring, the solenoid configured to retract the spring and move the bypass component to open the flow control inlet, and to expand the spring and move the bypass component to close the flow control inlet.

5. The system of claim 4, wherein the actuator unit comprises at least one guide pin coupled to the spring and the bypass component.

6. The system of claim 2, wherein the bypass component comprises:
a first inclined surface positioned nearer to the flow control inlet than to the flow control outlet, the first inclined surface inclined to flow the working fluid into the flow control sub-assembly in response to the fluid flow control sub-assembly being in the second position.

7. The system of claim 6, wherein the bypass component comprises:
a substantially horizontal surface directly connected to the first inclined surface; and
a second inclined surface positioned nearer to the flow control outlet than to the flow control inlet, the second inclined surface directly connected to the substantially horizontal surface, the second inclined surface inclined to flow the working fluid into the flow control outlet.

8. The system of claim 2, further comprising a conduit comprising a first end connected to the flow control outlet and a second end connected to a housing outlet, wherein the conduit is configured to flow the working fluid from the flow control outlet to the housing outlet and to atmosphere.

9. The system of claim 1, wherein the fluid flow control sub-assembly is in the second position in response to the expander being in a start-up state, a shutdown state or an emergency state, and wherein the fluid flow control sub-assembly is in the first position in response to the expander being in an operational state.

10. The system of claim 1, wherein the fluid flow control sub-assembly is directly attached to the housing, wherein, when operated in the second position, the fluid flow control sub-assembly is configured to flow an entirety of the working fluid through the housing without any portion of the working fluid flowing outside the housing.

11. A method comprising:
in a closed-loop thermal cycle comprising:
a housing;
an expander positioned within and surrounded by the housing, the expander configured to receive a working fluid and rotate in response to expansion of the working fluid flowing into an expander inlet and out of an expander outlet, the expander inlet and the expander outlet positioned in the housing;
a bypass channel positioned within and surrounded by the housing, the bypass channel defining a fluid flow path that bypasses the expander, and
a fluid flow control sub-assembly coupled to the expander and directly attached to the housing, the fluid flow control sub-assembly operable in a first state and in a second state, the method comprising:
detecting a first input to place the fluid flow control sub-assembly in the second state; and
in response to detecting the input:
receiving the working fluid at a housing inlet,
flowing the working fluid through the bypass channel bypassing the expander,
blocking the working fluid from flowing through the expander, and
flowing the working fluid out via a housing outlet; and
detecting a second input to place the fluid flow control sub-assembly in the second state; and
in response to detecting the second input:
flowing the working fluid received at the housing inlet through the expander, and
blocking the working fluid from flowing through the bypass channel.

12. The method of claim 11, wherein the expander is in at least one of a start-up state, a shutdown state or an emergency state when the fluid flow control sub-assembly is in the first state, and wherein the fluid flow control sub-assembly is placed in the first state in response to the state of the expander changing to an operation state.

13. The method of claim 11, wherein the fluid flow control sub-assembly comprises:
a flow control inlet;
a flow control outlet; and
a bypass component positioned between and fluidically coupling the flow control inlet and the flow control outlet,
wherein the method further comprises, in response to detecting the first input, placing the fluid flow control sub-assembly in the second state by positioning the bypass component to open the flow control inlet to receive the working fluid and bypass the expander.

14. The method of claim 13, wherein the method further comprises, in response to detecting the second input, placing the fluid flow control sub-assembly in the first state by positioning the bypass component to close the flow control inlet to flow the working fluid through the expander.

15. The method of claim 13, wherein placing the fluid flow control sub-assembly in the second state comprises moving the bypass component from the first state to the second state, and wherein placing the fluid flow control sub-assembly in the first state comprises moving the fluid flow control sub-assembly from the second state to the first state.

16. The method of claim 15, wherein the fluid flow control sub-assembly comprises an actuator unit configured to move the bypass component to close the flow control inlet and to open the flow control inlet, wherein the actuator unit comprises:
a spring coupled to the bypass component; and
a solenoid coupled to the spring,
wherein moving the bypass component from the first state to the second state comprises retracting, by the solenoid, the spring to move the bypass component to open the flow control inlet, and
wherein moving the bypass component from the second state to the first state comprises expanding, by the solenoid, the spring to move the bypass component to close the inlet.

17. The method of claim 11, wherein the fluid flow control sub-assembly is directly attached to the housing, wherein, in response to detecting the input, flowing an entirety of the working fluid through the housing without any portion of the working fluid flowing outside the housing.

18. A system comprising:
a housing;
a centrifugal expander positioned within and surrounded by the housing, the centrifugal expander configured to receive a working fluid and rotate in response to expansion of the working fluid flowing into an expander inlet and out of an expander outlet;
a bypass channel positioned within and surrounded by the housing, the bypass channel defining a fluid flow path that bypasses the centrifugal expander; and
a fluid flow control sub-assembly fluidically coupled to the bypass channel and the expander, and directly attached to the housing, the fluid flow control sub-assembly operable in a first position and in a second position, the fluid flow control sub-assembly, when operated in the first position, configured to flow the working fluid through the centrifugal expander while blocking the working fluid from flowing through the bypass channel, and when operated in the second position, configured to flow an entirety of the working fluid through the housing bypassing the centrifugal expander while blocking the working fluid from flowing through the centrifugal expander.

19. The system of claim 18, further comprising:
a bypass component positioned between and fluidically coupling a flow control inlet and a flow control outlet of the flow control sub-assembly; and
an actuator unit configured to move the bypass component between the first position and the second position, wherein the actuator unit comprises:
  a spring coupled to the bypass component; and
  a solenoid coupled to the spring, the solenoid configured to retract the spring and move the bypass component to the first position, and to expand the spring and move the bypass component to the second position.

20. The system of claim 18, wherein the system is an Organic Rankine Cycle.

\* \* \* \* \*